United States Patent
Lester

(10) Patent No.: US 7,481,127 B2
(45) Date of Patent: Jan. 27, 2009

(54) CONTINUOUSLY VARIABLE TRANSMISSION USING OSCILLATING TORQUE AND ONE-WAY DRIVES

(76) Inventor: William T. Lester, 4008 Shannon Dr., Fort Worth, TX (US) 76116

( * ) Notice: Subject to any disclaimer, the term of this patent is extended or adjusted under 35 U.S.C. 154(b) by 803 days.

(21) Appl. No.: 10/951,310

(22) Filed: Sep. 27, 2004

(65) Prior Publication Data

US 2006/0070469 A1   Apr. 6, 2006

(51) Int. Cl.
 F16H 29/08   (2006.01)
 F16D 27/10   (2006.01)
(52) U.S. Cl. ......................... 74/119; 74/125.5
(58) Field of Classification Search ............... 74/112, 74/116, 118, 119, 125.5
 See application file for complete search history.

(56) References Cited

U.S. PATENT DOCUMENTS

| | | | |
|---|---|---|---|
| 2,108,991 A | 2/1938 | Mueller | |
| 2,212,872 A | 8/1940 | Barker | |
| 2,227,867 A | 1/1941 | Steinhaus | |
| 2,293,962 A | 8/1942 | Baily | |
| 3,447,398 A | 6/1969 | Chen | |
| 3,805,514 A | 4/1974 | Bodine | |
| 3,983,759 A | 10/1976 | Linden | |
| 4,285,405 A | 8/1981 | Weir, Jr. | |
| 4,503,724 A | 3/1985 | Ward | |
| 4,907,474 A | 3/1990 | Bolger | |
| 5,009,132 A | 4/1991 | Gilberto | |
| 5,071,394 A | 12/1991 | Lester | |
| 5,136,888 A | 8/1992 | Nix | |
| 5,253,542 A | 10/1993 | Houze | |
| 5,388,469 A | 2/1995 | Woltering | |
| 5,860,321 A | 1/1999 | Williams et al. | |
| 6,044,718 A * | 4/2000 | Lester | 74/112 |
| 6,062,096 A * | 5/2000 | Lester | 74/112 |

FOREIGN PATENT DOCUMENTS

GB    87578    0/1908

OTHER PUBLICATIONS lestraeng.com webpage archive figure published Aug. 9, 2003.*
One Way Clutch Design Guide Types, Selection, Applications, Borg-Warner Automotive Automatic Transmission Systems Corporation, 1978, pp. 1-33.

* cited by examiner

Primary Examiner—Richard W Ridley
Assistant Examiner—James Pilkington
(74) Attorney, Agent, or Firm—Geoffrey A. Mantooth

(57) ABSTRACT

A transmission utilizes oscillating torque to vary the mechanical power transmitted to a load. The transmission has a rotatable input member and a rotatable mass. The transmission also has a member with an eccentric offset, with the rotatable mass rotatably coupled to the offset and being eccentric with respect to the offset. The input member is coupled to the rotatable mass by a linkage so that the rotation of the input member causes the rotatable mass to rotate and apply centrifugal force to the member with the eccentric offset. First and second one-way clutches are coupled between the eccentric offset member and an output member. The first one-way clutch drives the output member in one direction and the eccentric offset member is driven in the one direction and the second one-way clutch prevents the output member from rotating in the other direction.

8 Claims, 6 Drawing Sheets

CONTINUOUSLY VARIABLE TRANSMISSION USING OSCILLATING TORQUE AND ONE-WAY DRIVES

FIELD OF THE INVENTION

The present invention relates to transmissions of the type that are used to regulate the transmission of power from an engine or a prime mover to a load, such as are used in vehicles.

BACKGROUND OF THE INVENTION

Transmissions are used in a variety of applications to change the speed and torque provided by an engine or prime mover. One popular application of transmissions is in an automobile. In an automobile, the transmission is connected between the engine and the drive wheels or tires.

Prior art automobiles utilize fixed ratio transmissions. These transmissions have a set of gears that provide a few fixed and discrete speed ratios between the input from the engine and the output to the tires. Engine rpm (revolutions per minute) varies over a wide range for each speed ratio. Because the engine must operate over a wide range of speeds, its overall efficiency is reduced.

Continuously variable transmissions offer a way to boost engine efficiency. Unlike fixed ratio transmissions, continuously variable transmissions offer a wide range of speed ratios between the input from the engine and the output to the tires. This allows the engine to operate over a narrow range of optimum rpm's, wherein the engine efficiency can be increased. By varying the speed ratio, the engine speed can be maintained in its optimum range, even for a variety of driving conditions, thereby improving fuel efficiency.

My previous patents, U.S. Pat. Nos. 6,062,096 and 6,044,718, disclose a continuously variable transmission that utilizes rotating eccentric masses to produce an oscillating torque. The oscillating torque is converted into one-way torque by one-way drives or clutches.

Since those patents, I have continued to refine my design. The present invention builds on my previous work and presents a more simplified design, particularly in the apparatus that rotates the masses.

SUMMARY OF THE INVENTION

It is an object of the present invention to provide a continuously variable transmission.

The transmission of the present invention comprises a rotatable input member and a rotatable mass. There is also a member with an eccentric offset, the rotatable mass being rotatably coupled to the offset and being eccentric with respect to the offset. The input member is coupled to the rotatable mass by a linkage so that the rotation of the input member causes the rotatable mass to rotate about the offset. First and second one-way clutches are coupled between the eccentric offset member and an output member. The first one-way clutch drives the output member in one direction when the eccentric offset member is driven in the one direction and the second one-way clutch prevents the output member from rotating in the other direction.

In accordance with one aspect of the present invention, the rotatable mass is a first rotatable mass and the eccentric offset is a first eccentric offset. A second rotatable mass is rotatably coupled to a second eccentric offset on the eccentric offset member. The first and second eccentric offsets being opposite of one another with respect to a rotational axis of the eccentric offset member. The input member is coupled to the second rotatable mass by a second linkage so that rotation of the input member causes the second rotatable mass to rotate.

In accordance with one aspect of the present invention, the linkage comprises a four bar linkage.

In accordance with another aspect of the present invention, the four bar linkage comprises a transverse member coupled to an input shaft, a link between the transverse member and the mass, a first arm between the mass and the eccentric offset and a second arm extending between the eccentric offset and an axis of rotation of the eccentric offset member.

In accordance with another aspect of the present invention, the member with the eccentric offset comprises a crankshaft.

In accordance with another aspect of the present invention, the input member comprises a yoke.

The present invention also provides a method of transmitting mechanical power from a source to a load. A rotational input is received from the source. The rotational input is used to rotate an eccentric first mass about a first offset and to rotate a second eccentric mass about a second offset, thereby producing a torque on a shaft incorporating the first and second offset. The rotation of the first and second masses being through linkages from the input to the first and second masses. The shaft is allowed to rotate in a first direction but the rotation of the shaft is prevented in the opposite direction. The torque acting on the shaft in the first direction is provided to the load.

DESCRIPTION OF THE PREFERRED EMBODIMENT

Figure 1:
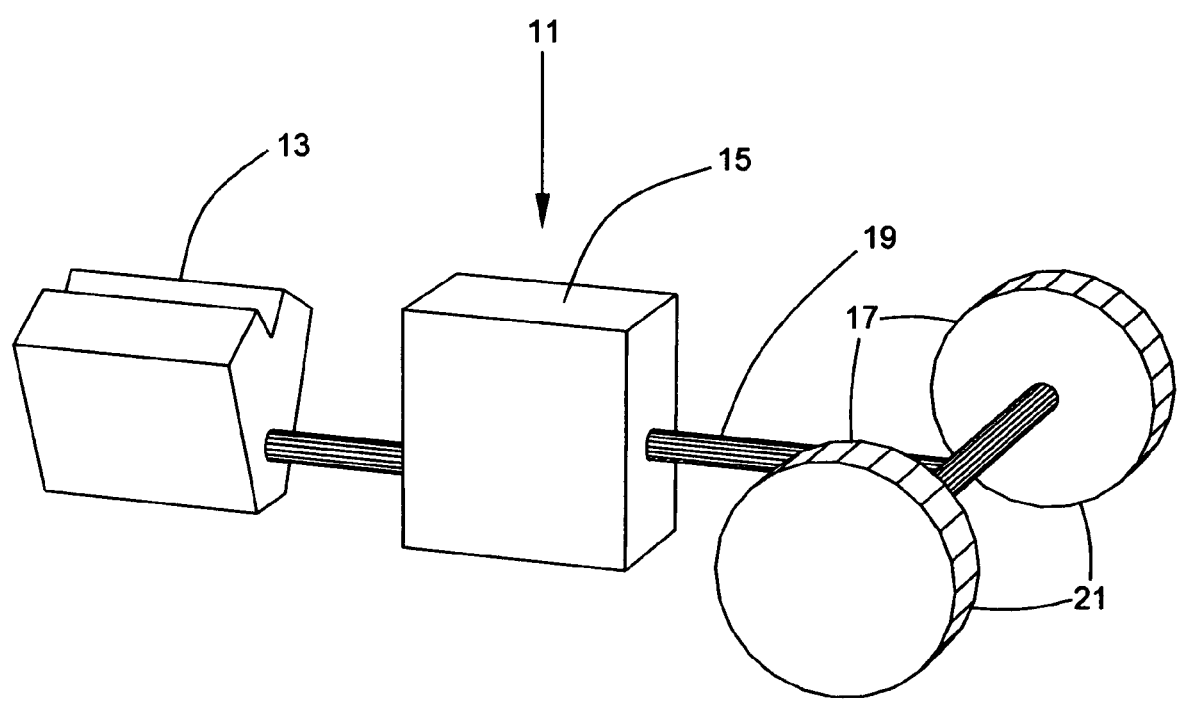
FIG. 1 is a schematic view of a vehicle drive train, showing the transmission of the present invention.

In FIG. 1, there is shown a schematic diagram of a vehicle power system 11. The system has a prime mover 13, a transmission 15, and an output load 17.

The prime mover 13 is typically an internal combustion engine that can be powered by gasoline, diesel, natural gas, etc. Alternatively, the prime mover can be electric motors or some other source of power.

The transmission 15 is that of the present invention, shown in accordance with a preferred embodiment. The transmission 15 has an input that is connected to the prime mover 13 and an output that is connected to the load 17. The load 17 is shown as being a drive shaft 19 and vehicle wheels 21.

The transmission 15 is of a continuously variable type. Many internal combustion engines (and electric motors) operate more efficiently within a narrow range of engine speeds. A continuously variable transmission can be provided with a narrow range of input speeds and produce a wide range of output speeds for the load. Unlike prior art gear transmissions, where each output speed has a specific gear, a continuously variable transmission provides a continuous output of speeds. This allows the engine to operate within a narrow, and thus more efficient, range of speeds.

Figure 2:
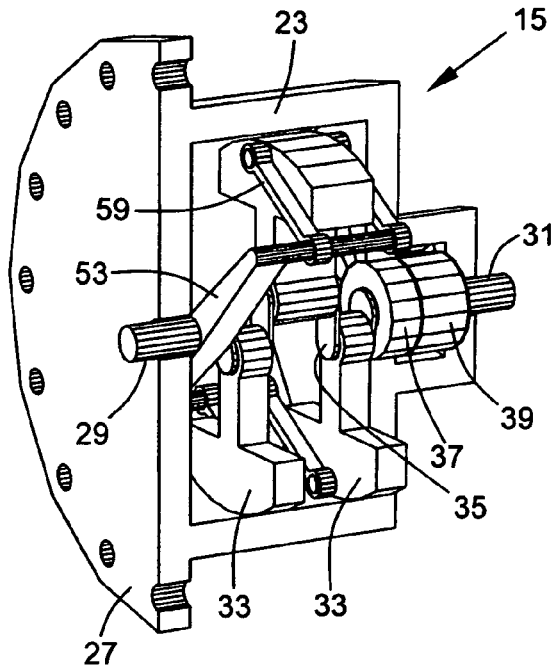
FIG. 2 is an isometric view of the transmission of the present invention, in accordance with a preferred embodiment.
Figure 3:
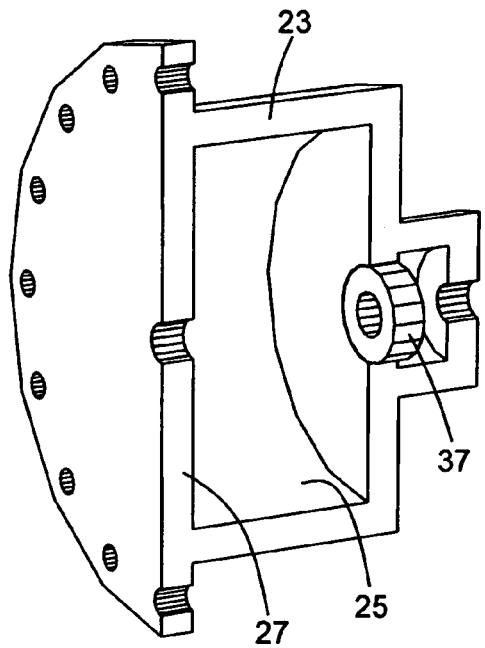
FIG. 3 is an isometric view of the casing and one of the one-way clutches.
Figure 4:
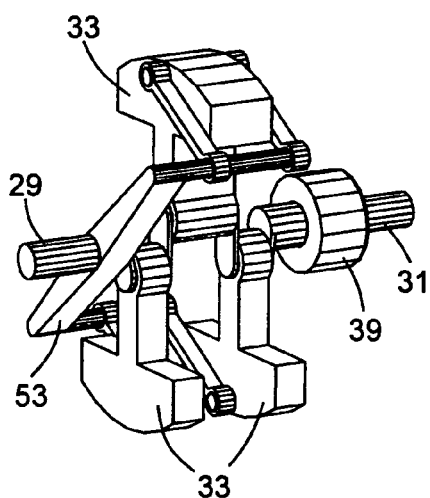
FIG. 4 is an isometric view of the rotating assembly that is housed within the casing.
Figure 5:
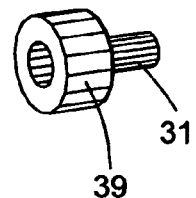
FIG. 5 is an isometric view of the output shaft and another one-way clutch.

Referring to FIGS. 2-4, the transmission 15 has a casing 23 or enclosure. The casing 23 has a cavity 25 for receiving the movable components of FIG. 8A. The casing 23 also has a flange 27, or other mounting structure, to secure the casing to a chassis, frame, etc. of the vehicle.

The transmission 15 has an input shaft 29 and an output shaft 31. The input shaft 29 is coupled to rotatable masses 33. The input shaft 29 rotates the rotatable masses 33 about an eccentric crankshaft 35. The rotating masses 33, which are eccentric about the crankshaft, apply centrifugal force to the crankshaft 35, rotating the crankshaft in an oscillating manner. The bi-directional rotation of the crankshaft 35 is converted into rotation in a single direction by the output clutches 37, 39, which drive the output shaft 31.

Figure 6C:
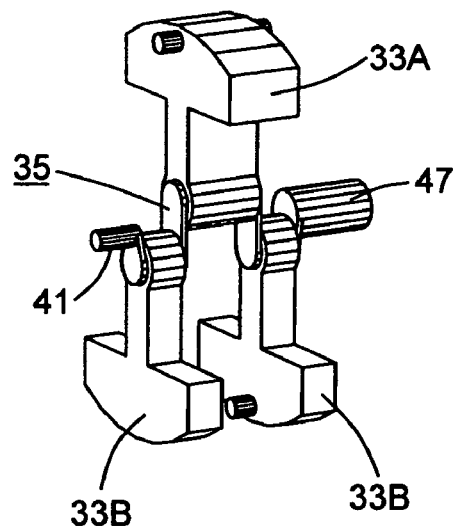
FIGS. 6A, 6B and 6C are respective isometric views of the rotatable masses, of the crankshaft, and of the assembled rotatable masses and crankshaft.
Figure 6A:
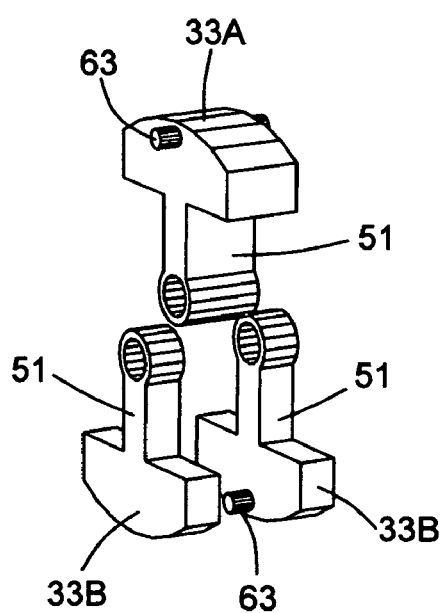
Figure 6B:
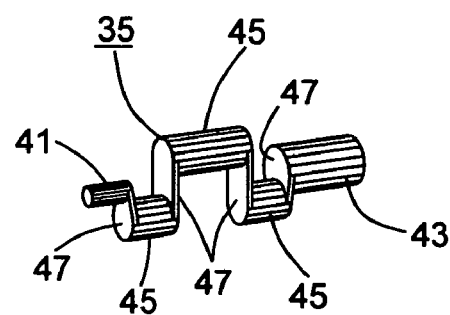

Referring to FIGS. 6A, 6B and 6C, the rotatable masses 33 and crankshaft 35 are shown. The crankshaft 35 has an input end 41 and an output end 43 which are concentric along a longitudinal, rotational axis of the crankshaft. The crankshaft 35 has, located between the input and output ends 41, 43, offset shafts 45 that are eccentric to the rotational axis of the crankshaft. The outset shafts 45 are joined to one another and to the respective input and output ends by arms 47. In the preferred embodiment, there are three offset shafts 45, namely two endmost offset shafts and a center offset shaft. The center offset shaft is positioned 180 degrees from the two endmost offset shafts. Thus, the offset shafts are symmetrical about the rotational axis of the crankshaft. The offset shafts are also spaced along the length of the crankshaft.

The rotatable masses 33 are mounted to the crankshaft 35. Each rotatable mass 33 is mounted to the crankshaft by way of an extension or arm 51. One end of the arm 51 is rotatably mounted to an offset shaft 45 by a bearing, while the other end of the arm is fixedly coupled to the mass 33. In the preferred embodiment, the mass 33A that is coupled to the central offset shaft is substantially the same as the combined masses, 33B that are coupled to the endmost offset shafts.

Figure 7A:
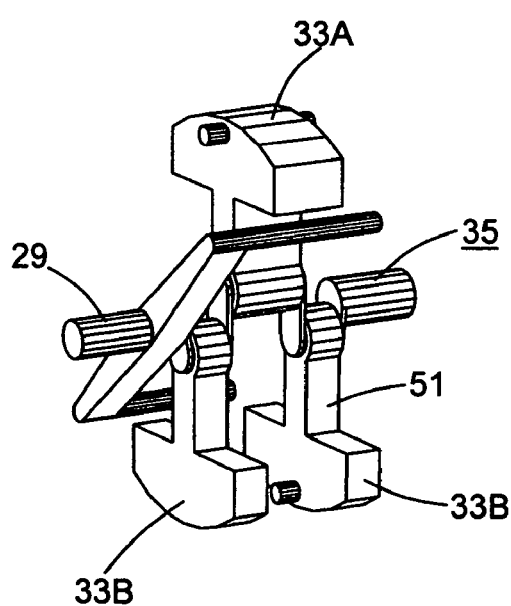
FIGS. 7A and 7B are respective isometric views of the assembled input member and rotatable masses, and of the input member.
Figure 7B:
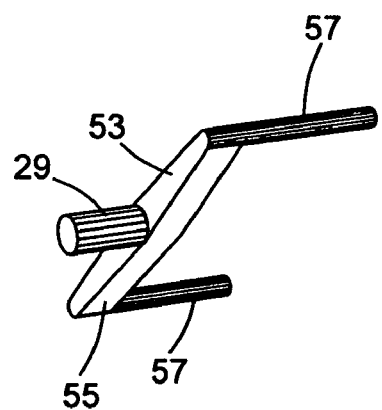

The masses 33 can rotate about the respective offset shafts 45 without interfering with each other. A linkage mechanism connects the input shaft 29 to the masses 33 so that when the input shaft rotates, the masses rotate about the offset shafts 45. As shown in FIGS. 7A and 7B, the input shaft 29 is part of an input member. In the preferred embodiment, the input member comprises the input shaft and a yoke 53. The input shaft is fixedly coupled to the yoke 53. The yoke 53 has a transverse link 55 that is transverse to the input shaft 29. At each end of the transverse link 55 is an extension 57, oriented parallel to the input shaft 29. The yoke has, on the side opposite of the input shaft, an opening for receiving the input end 41 of the crankshaft 35. The input shaft 29 and yoke 53 can rotate independently of the crankshaft 35.

Figure 8A:
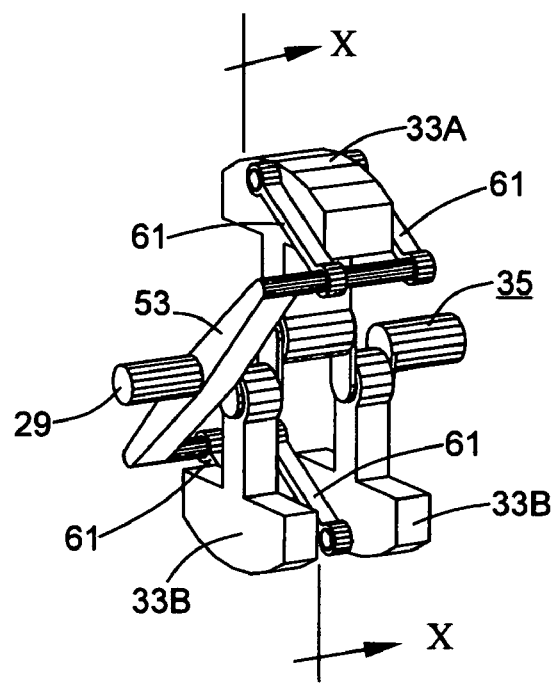
FIGS. 8A and 8B are respective isometric views of the assembled input shaft and rotatable masses, and of the links.
Figure 8B:
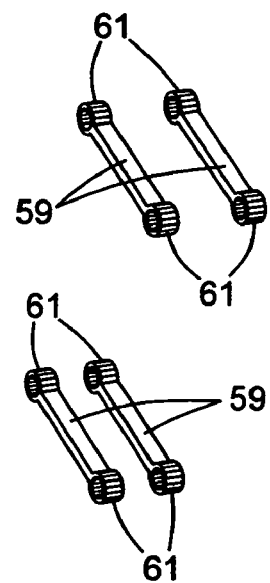
Figure 9:
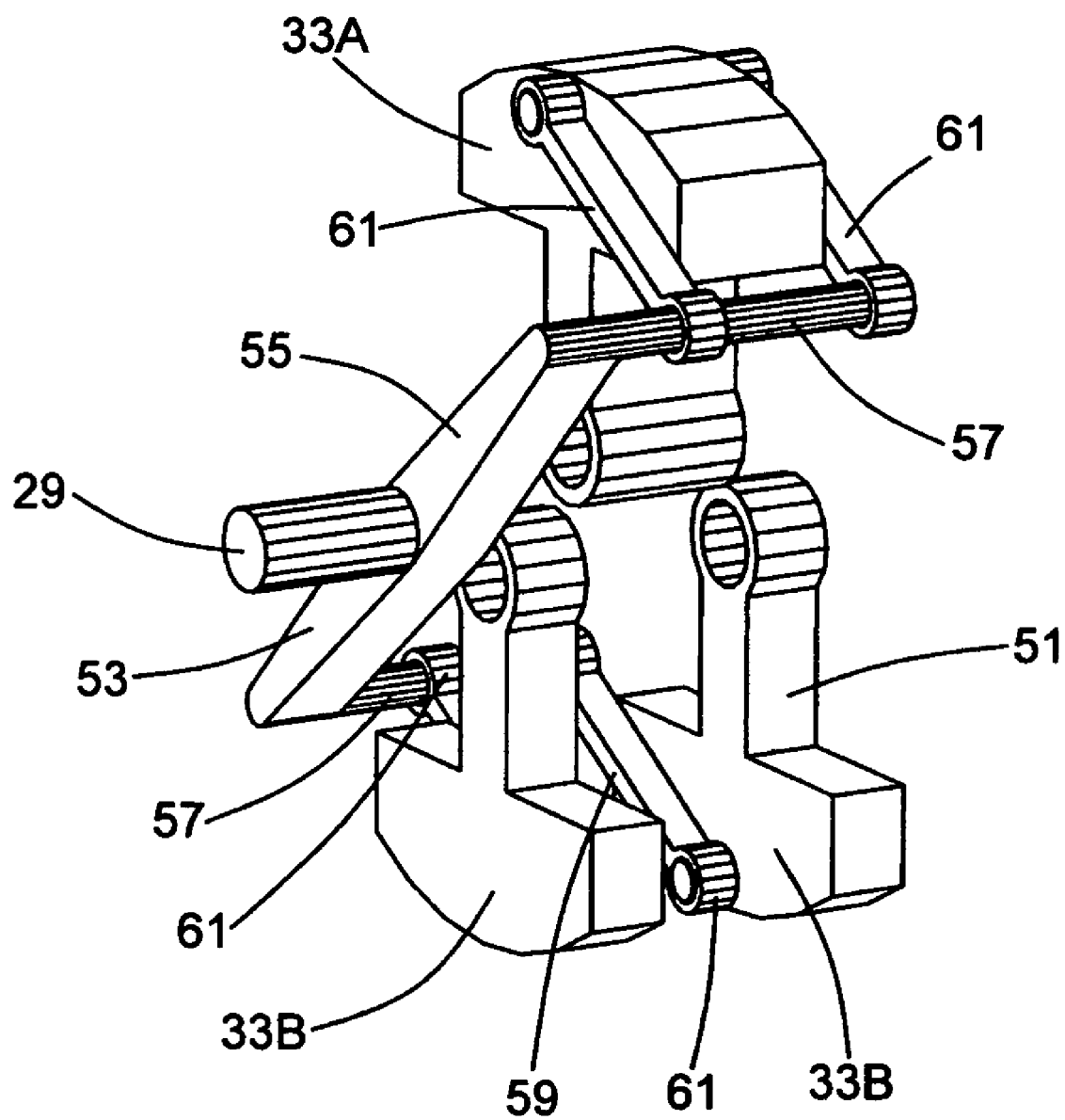
FIG. 9 is an isometric view of the input shaft, links and rotatable masses, without the crankshaft.

Referring to FIGS. 8A and 8B, links 59 couple the extensions 57 of the yoke 53 to the masses 33. Each link 59 has a bearing 61 on each end. One end of each link 59 is rotatably coupled to an extension 57, while the other end of each link is rotatably coupled to a mass 33 (such as by a projecting pin 63). In the preferred embodiment, each endmost mass 33B is coupled to the yoke by a link 59, while the center mass 33A is coupled to the yoke by two links 59 (one on each side). FIG. 9 illustrates the linkages between the masses and the yoke. The crankshaft is not shown in FIG. 9 for illustrative purposes. The endmost masses 33B rotate in unison with each other.

Figure 10:
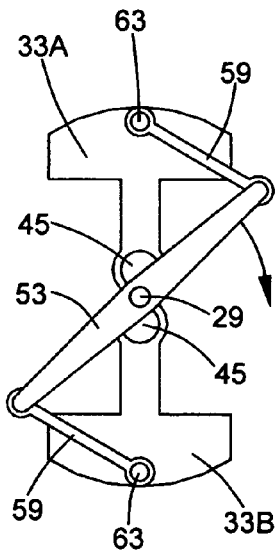
FIGS. 10-15 are views of the rotatable masses and input member shown in various orientations about the crankshaft.
Figure 11:
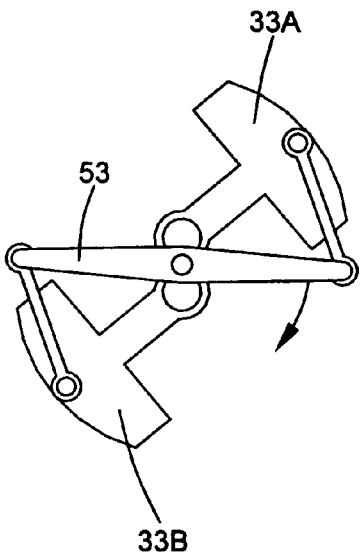
Figure 12:
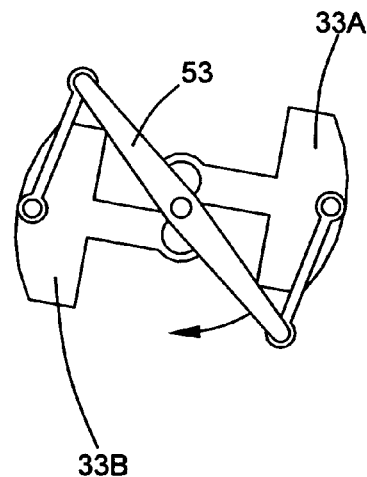
Figure 13:
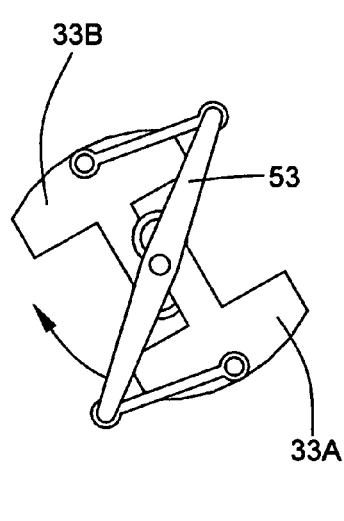
Figure 14:
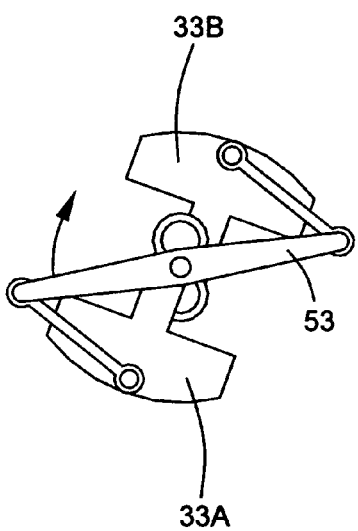
Figure 15:
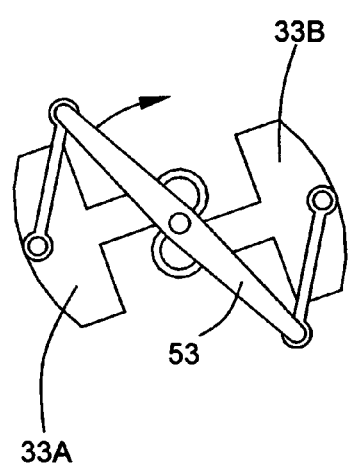

The arms 47 of the crankshaft 35, yoke 53, links 59 and the mass arms 51 form a four bar linkage between the input shaft 29 and the masses 33. Thus, the rotation of the input shaft 29 causes the masses 33 to rotate about the offset shafts 45 of the crankshaft 35. FIGS. 10-15 illustrate the rotation of the yoke 53 and the masses about the offset shafts 45. In FIGS. 10-15, the crankshaft 35 is shown as being stationary and only one of the endmost masses 33B is shown (FIG. 10 is a view of FIG. 8A, taken along lines X-X). In FIGS. 10-15, the yoke 53 rotates clockwise. In FIG. 10, the masses 33A, 33B are opposite of one another and exert no torque on the crankshaft. The yoke rotates clockwise to the position shown in FIG. 11 and moves the masses 33A, 33B about the offset shafts. Torque is applied to the crankshaft in a clockwise direction. In FIG. 12, the yoke continues to rotate the masses about the offset shafts; the torque applied to the crankshaft increases in the clockwise direction. In FIG. 13, the yoke continues to rotate the masses and the torque applied to the crankshaft decreases in the clockwise direction. In FIG. 14, the masses apply some torque to the crank shaft in the counterclockwise direction. In FIG. 15, the masses are nearly opposite of each other and are applying maximum counterclockwise torque to the crankshaft. The masses repeat the rotation of FIGS. 10-15.

The yoke 53 can either push or pull the masses. In the example described above with respect to FIGS. 10-15, the yoke pulls the masses, such that the links 59 are in tension. The links can be rigid members or flexible members. Alternatively, the yoke could push the masses with the links being in compression.

The use of linkages to rotate the masses is an improvement over the use of gears, as taught in my earlier patents. The transmission is subject to less vibration, as tighter tolerances can be used. Also, fewer parts are required, simplifying manufacturing and increasing reliability.

The rotating masses apply oscillating torque to the crankshaft. This torque is converted into one-way rotation by the clutches 37, 39 (see FIGS. 2-5). One clutch 37 is fixed to the casing 23. Therefore, when the crankshaft rotates in one direction, this torque is applied to the casing 23 and thus the frame, and is not applied to the load. When the crankshaft rotates in the opposite direction, this is passed through by way of the clutch 39 to the output shaft 31 and thus to the load. Bearings mount the input and output shafts 29, 31 to the casing 23. The output end 43 of the crankshaft is received by the two one-way clutches 37, 37.

Speed control can be accomplished with the transmission. The figures only show one set of rotatable masses 33. For speed control, a second set of rotatable masses is used, spaced axially from the first set. To control the speed, the phase of the first set of masses would be adjusted with respect to the second set of masses, as described in my U.S. Pat. Nos. 6,044,718 and 6,062,096. Full speed is provided by the masses of both sets being in phase and aligned with one another. Speed reduction and torque reduction is provided by shifting the phase of one set of masses with respect to the other set of masses so that the two sets of masses are out of phase. Zero torque is applied to the crankshaft when the two sets of masses are 180 degrees out of phase with respect to each other.

The transmission of the present invention can be made in a relatively compact size. The transmission can be scaled to suit the particular application. More torque would require larger masses. The transmission could be used on a variety of vehicles from high performance racing cars to cars and trucks, to children's play toys. In addition, the transmission can also be used in non-vehicular applications.

The foregoing disclosure and showings made in the drawings are merely illustrative of the principles of this invention and are not to be interpreted in a limiting sense.

The invention claimed is:

1. A transmission, comprising:
   a) a rotatable input member;
   b) a rotatable mass;
   c) a member with an eccentric offset, the rotatable mass rotatably coupled to the offset and being eccentric with respect to the offset;
   d) the input member coupled to the rotatable mass by a linkage so that rotation of the input member causes the rotatable mass to rotate about the offset;
   e) first and second one-way clutches coupled between the eccentric offset member and an output member, the first one-way clutch driving the output member in one direction when the eccentric offset member is driven in the one direction, the second one-way clutch preventing the arm from rotating in the other direction
   f) the linkage comprises a four bar linkage.

2. The transmission of claim 1, wherein the rotatable mass is a first rotatable mass and the eccentric offset is a first eccentric offset, further comprising a second rotatable mass that is rotatably coupled to a second eccentric offset on the eccentric offset member, the first and second eccentric offsets being opposite of one another with respect to a rotational axis of the eccentric offset member, the input member coupled to the second rotatable mass by a second linkage so that rotation of the input member causes the second rotatable mass to rotate.

3. The transmission of claim 2 wherein:
   a) the member with the eccentric offset comprise a crankshaft;
   b) the input member comprises a yoke.

4. The transmission of claim 1, wherein the four bar linkage comprises a transverse member coupled to an input shaft, a link between the transverse member and the mass, a first arm between the mass and the eccentric offset and a second arm extending between the eccentric offset and an axis of rotation of the eccentric offset member.

5. The transmission of claim 1, wherein the member with the eccentric offset comprises a crankshaft.

6. The transmission of claim 1, wherein the input member comprises a yoke.

7. The transmission of claim 1, wherein:
   a) the member with the eccentric offset comprises a crankshaft;
   b) the input member comprises a yoke.

8. A method of transmitting mechanical power from a source to a load, comprising the steps of:
   a) receiving a rotational input from the source;
   b) using the rotational input to rotate an eccentric first mass about a first offset and to rotate a second eccentric mass about a second offset, thereby producing a torque on a shaft incorporating the first and second offsets, the rotation of the first and second masses being through a four bar linkage from the input to the first and second masses;
   c) allowing the shaft to rotate in a first direction, but preventing the rotation of the shaft in the opposite direction;
   d) providing the torque acting on the shaft in the first direction to the load.

* * * * *